United States Patent Office 3,211,607
Patented Oct. 12, 1965

3,211,607
BACTERICIDAL AND FUNGICIDAL COMBINATION OF 2-IMINO IMIDAZOLINES OR HEXAHYDROPYRIMIDINE AND N,N'-DIPHENYL UREA
Ernst Model and Walter Stammbach, Basel, and Jakob Bindler, Riehen, near Basel, Switzerland, assignors to Geigy Chemical Corporation, Ardsley, N.Y., a corporation of Delaware
No Drawing. Filed Nov. 28, 1962, Ser. No. 240,748
Claims priority, application Switzerland, Dec. 1, 1961, 13,972/61
14 Claims. (Cl. 167—30)

The present invention concerns bactericidal and fungicidal agents, a method for decreasing by the use of these agents the number of bacteria and fungi in a substrate, infested therewith and, at the same time, protecting such substrate for a long period of time from attack by bacteria and fungi; the invention relates further to an industrial product consisting of the organic material rendered poor in bacteria and fungi and remanently protected against the attack of bacteria and fungi by the use of such agents.

The bactericidal and fungicidal agents according to the invention contain at least one heterocyclic compound of formula

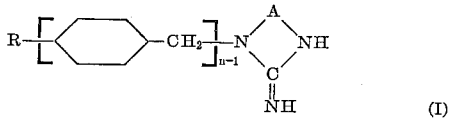

(I)

the tautomeric formula of which contains the grouping

(Ia)

or of its salts with acids which do not impair the bactericidal and fungicidal properties of the agent, e.g., the hydrohalides, sulphates, acetates or lactates, and at least one urea derivative of formula

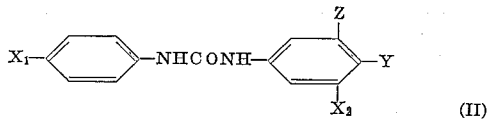

(II)

For the sake of brevity, Formula I is used in this specification and in the appended claims to designate both tautomeric forms.

In Formula I

R represents an alkyl radical having from 10 to 16 and preferably 12 to 14 carbon atoms,
A represents an alkylene radical of from 2 to 5 carbon atoms, bound by $\alpha,\beta$- or $\alpha,\gamma$- carbon atoms, and thereby completes a heterocyclic nucleus selected from the group consisting of the imidazolidine and hexahydropyrimidine nuclei, and
$n$ represents an integer ranging from 1 to 2.

In Formula II $X_1$ represents chlorine or bromine,
$X_2$ represents chlorine or trifluoromethyl,
Y represents chlorine when $X_2$ is chlorine and hydrogen when $X_2$ trifluoromethyl, and
Z represents hydrogen or trifluoromethyl.

The ratio by weight of compounds of Formula I to the compounds of Formula II ranges between 9:1 to 2:8 and especially from 8:2 to 3:7, optimal results being obtained within a range of 7:3 to 4:6.

R is, for example, the n-decyl, n-dodecyl, n-tetradecyl or hexadecyl group or the 4-n-dodecylbenzyl group.

Alkylene radicals A bound at $\alpha,\beta$-carbon atoms are, for example, the 1,2-ethylene, 1,2-propylene, 1,2- or 2,3-butylene radical; alkylene radicals A bound at $\alpha,\gamma$-carbon atoms are, e.g., the 1,3-propylene, 1,3-butylene, the 1,3- or 2,4-pentylene radical.

With regard to the fungicidal action, those agents have proved the best which contain as active substances a 2-imino-imidazolidine of formula

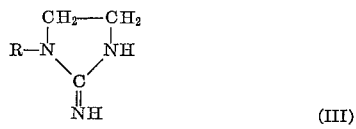

(III)

wherein R is an alkyl radical having 12 to 14 carbon atoms, or of preferably non-toxic salts thereof with the above-defined acids, particularly the hydrohalide, and of 3-trifluoromethyl-4,4'-dichloro-N,N'-diphenyl urea.

A mixture of the two active substances is added either directly to the organic materials whose number of bacteria and/or fungi is to be reduced or eliminated and which are to be given simultaneously long-lasting protection from attack by bacteria and fungi, or such materials are impregnated with solutions or dispersions of a mixture of active substances. Agents containing non-toxic mixtures according to the invention are used to protect ready-for-use preparations of inorganic or organic pigments for the painting industry, articles made of synthetic substances, plasticizers, lacquers, from attack by fungi.

In the form of solutions or dispersions, the new mixtures of active substances are used, for example, to reduce the bacterial and fungal number of all types of textile fibres or of paper or of all other types of industrial fibers or they are used for the production of sprays, e.g., atomizer fillings for the disinfection of enclosed spaces.

In the form of aqueous solutions or dispersions they are used advantageously to decrease or eliminate the number of bacteria and fungi on or in washable goods, and at the same time to give such goods long lasting protection against attack by bacteria and fungi. For this application, the aqueous solutions or dispersions also contain advantageously washing agents, for example, anion active wash-active substances such as aromatic sulphonic acids substituted by lipophilic groups or their water soluble salts such as the sodium salt of dodecylbenzene sulphonic acid or those of naphthalene sulphonic acid-formaldehyde condensation products, or water soluble salts of the sulphuric acid monoester of higher molecular alcohols or their polyglycol ethers, e.g., of dodecyl alcohol sulphate or of dodecyl polyglycol ether sulphate or alkali metal salts of higher fatty acids, also non-ionogenic wash-active substances such as polyglycol ethers of higher fatty alcohols, also polyglycol ethers of higher molecular alkylated phenols, as well as, so-called "amphoteric" wash-active substances such as reaction products of alkali metal salts of halogen lower fatty acids and polyalkylene polyamines containing lipophilic radicals, e.g., lauryl diethylene triamine.

The content of mixtures of active substance as defined in the aqueous solutions or dispersions according to the invention which may contain washing agents, i.e., of the washing or rinsing liquors is about 50 to 500 p.p.m.

In addition to the compositions of active substances with or without washing agents, the aqueous treatment baths can also contain the usual additives such as water-soluble alkali metal or ammonium perborates, polyphosphates, carbonates, silicates, optical brightening agents, plasticisers, salts having an acid reaction such as ammonium or zinc silicofluoride, or certain organic acids such as oxalic acid, also finishing agents, e.g., those having a synthetic resin basis or containing starch.

As washable goods whose number of bacteria and fungi can be reduced or eliminated with aqueous solutions containing the mixtures of active substances according to the invention, and, optionally, also washing agents, chiefly fibers are meant, namely those of natural origin such as cellulose fibers, e.g., cotton, or polypeptide fibers, e.g., wool or silk, or synthetic fibers based on polyamide, polyacrylonitrile or polyester.

The mixture of active substances according to the invention can also be incorporated into soaps, such as toilet soaps.

The organic materials treated with mixtures of active substances according to the invention, particularly the fibers treated with aqueous solutions containing such mixtures of active substances are to a great extent free from bacteria and fungi and remain resistant to contamination with such organisms for a long time.

The fungicidal and bactericidal action of the new mixtures of active substances is far superior to that of the individual components. Because of this synergistic effect, a given decontamination is attained with a considerably smaller concentration of mixture of active substances in a given amount of carrier than when the individual components are used singly. In the mixtures of active substances according to the invention, the bactericidal action of the 2-imino-1,3-di-nitrogen heterocyclic compounds as defined in Formula I on gram-positive bacteria is generally retained in full and is increased towards gram-negative bacteria and fungi.

The biocidal effect of the mixtures of active substances according to the invention covers, for example, *Ctenomyces interdigitalis, Candida albicans, Penicillium expansum, Penicillium italicum, Stachybotris atra, Chaetomium globosum* as well as certain bacteria, e.g., Staphylococci and, particularly marked, *Coli bacilli*.

Further details can be seen from the following examples. Where not otherwise expressly stated, parts are given as parts by weight. The temperatures are in degrees centigrade. The relationship of parts by weight to parts by volume is as that of grammes to cubic centimetres.

EXAMPLE 1.—SYNERGISTIC EFFECT ON BACTERIA AND FUNGI OF MIXTURES OF ACTIVE SUBSTANCES

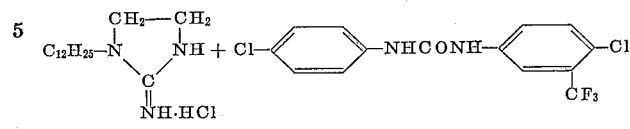

in different proportions.

*Test method.*—The tests are made in principle according to the method described by John M. Leonard and Virginia L. Blackford in "Fungus-inhibitive properties of bromoacetamides," Journal of Bacteriology, 57, p. 339, March 1949, by adding the active substance in graduated concentrations to the nutrient. A suitable nutrient is chosen for each organism to be tested, namely, for: *Escherichia coil 96, Penicillium expansum, Penicillium italicum, Fusarium oxysporum, Candida albicans, Aspergillus niger, Staphylococcus aureus*. The series of concentration chosen at will is: 0.1, 0.3, 1.3, 10, 30, 100 and 1000 p.p.m. The active substance is previously dissolved in a concentration of 2.4% in ethylene glycol monomethyl ether and the solution is so diluted with water that the desired amounts of active substance can be added to the nutrient or wort agar before it solidifies. The agar is poured in suitable portions into Petri dishes and, after solidification, inoculated with the 24 hour old bacteria strains or with 10 day old fungi strains. The bacteria are incubated for 48 hours at 37° C. and the fungi for at least 72 hours at 28°; the lowest concentration of the different active substances which prevents all growth of the organism is then noted. These values are given in the following table.

*Table 1*

Marginal action against various microorganisms. The figures give the lowest concentration in p.p.m. at which no growth of the microorganisms occurs

| Weight ratio of I:II | Escherichia coli 96 | Penicillium expansum | Penicillium italicum | Fusarium oxysporum | Candida albicans |
|---|---|---|---|---|---|
| 9:1 | 30 | 300 | 100 | 300 | 300 |
| 8:2 | 10 | 30 | 100 | 100 | 30 |
| 7:3 | 10 | 10 | 30 | 100 | 30 |
| 6:4 | 10 | 10 | 10 | 300 | 30 |
| 5:5 | 10 | 10 | 10 | 100 | 10 |
| 4:6 | 10 | 10 | 10 | 100 | 10 |
| 3:7 | 10 | 10 | 10 | 100 | 10 |
| 2:8 | 30 | 30 | 100 | 100 | 30 |
| I alone | 30 | 300 | 100 | 300 | 100 |
| II alone | >300 | >1,000 | >1,000 | >1,000 | >1,000 |

Similar results are obtained on using 1-tetradecyl-2-imino-imidazolidine hydrochloride or 1-(4'-n-dodecylbenzyl)-2-imino imidazolidine hydrochloride instead of (I) and on using the compound of the formula

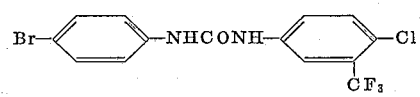

or

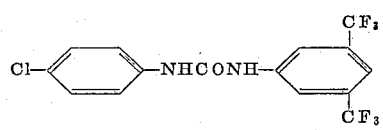

instead of (II).

EXAMPLE 2.—SYNERGISTIC EFFECT ON VARIOUS MICROORGANISMS OF MIXTURES OF ACTIVE SUBSTANCES

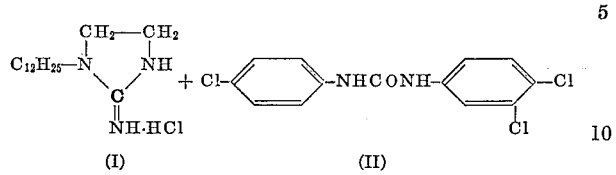

The test method is the same as in Example 1.

*Table 2*

| Weight ratio of I:II | Penicillium expansum | Candida albicans | Penicillium italicum |
|---|---|---|---|
| 9:1 | 300 | 100 | 30 |
| 8:2 | 30 | 30 | 30 |
| 7:3 | 10 | 100 | 30 |
| 6:4 | 10 | 100 | 10 |
| 5:5 | 10 | 100 | 10 |
| 4:6 | 10 | 100 | 10 |
| 3:7 | 30 | 300 | 100 |
| 2:8 | 100 | 300 | 100 |
| I alone | 100 | 300 | 100 |
| II alone | >1,000 | >1,000 | >1,000 |

Similar results are obtained when using a mixture, for instance of (a) 5 parts of 1-tetradecyl-2-imino-imidazolidine hydrochloride, 5 parts of 1-dodecyl-2-amino-hexahydropyrimidine and 10 parts of 3-trifluoromethyl-4,4'-dichloro-N,N'-diphenyl urea, (b) 4 parts of 1-tetradecyl-2-imino-imidazolidine hydrochloride, 6 parts of 1-dodecyl-2-imino-imidazolidine hydrochloride and 10 parts of 3,5-bis-(trifluoromethyl)-4'-chloro-N,N'-diphenyl urea, and (c) 10 parts of 1-tetradecyl-2-imino-imidazolidine hydrochloride, 6 parts of 3-trifluoromethyl-4,4'-dichloro-N,N'-diphenyl urea and 4 parts of 3,5-bis-(trifluoromethyl)-4'-chloro-diphenyl urea or 3,4,4'-trichloro-N,N'-diphenyl urea or 3-trifluoromethyl-4-chloro-4'-bromo-N,N'-diphenyl urea.

EXAMPLE 3.—SYNERGISTIC EFFECT ON VARIOUS MICROORGANISMS OF MIXTURES OF ACTIVE SUBSTANCES

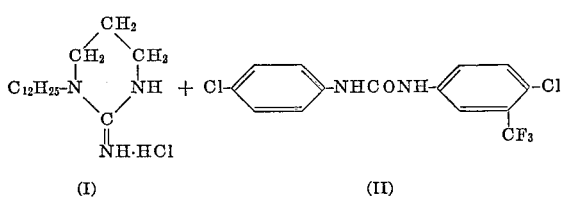

as well as

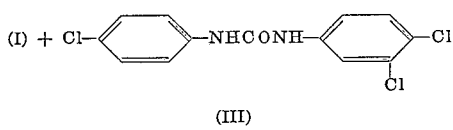

Test method as in Example 1.

*Tables 3 and 4*

Marginal action against various microorganisms. The figures give the lowest concentration in p.p.m. at which no growth of the microorganisms occurs.

*Table 3.—Action on Escherichia coili 96*

| Substance | Marginal action in p.p.m. |
|---|---|
| I alone | 100 |
| II alone | >1,000 |
| III alone | >1,000 |
| I+II in weight ratio of 1:1 | 30 |
| I+III in weight ratio of 1:1 | 30 |

*Table 4.—Action against various fungi*

| | Penicillium expansum | Penicillium italicum | Fusarium oxysporum | Candida albicans |
|---|---|---|---|---|
| (I) alone | 1,000 | 100 | 1,000 | 300 |
| (II) alone | >1,000 | >1,000 | >1,000 | >1,000 |
| (I)+(II) in weight ratio of 1:1 | 10 | 10 | 100 | 30 |

EXAMPLE 4.—SYNERGISTIC EFFECT ON *STAPHYLOCOCCUS* SG 511, TESTED IN THE LAUNDRY, OF MIXTURES OF ACTIVE SUBSTANCES

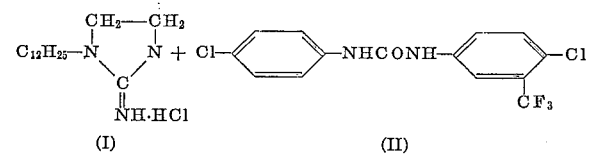

in the ratio of 2 parts of (I) to 1 part of (II).

*Test method.*—In order to test the above mixture of substances when applied under practical conditions, the mixture of 2 parts of compound of Formula I + 1 part of compound of Formula II dissolved in ethylene glycol monomethyl ether is added to the washing liquor so that there are 200 mg. of active substance per litre washing liquor. Octylphenol polyglycol ether is used as washing agent; the washing liquor contains 0.3 g./litre of this washing agent, 0.5 g./litre perborate and 1.7 g./litre polyphosphate.

The liquor ratio was 1:6. In addition to a textile cutting, (test sample) which is of the same material as the other washable goods, namely, cotton, the usual laundry from a hospital was washed in a 10 kg. drum washing machine. Two tests were made, one at 40° and the other at 90° washing temperature. Treatment at this temperature lasted for 18 minutes. The goods were then rinsed four times, wrung out and dried. The duration of the disinfectant action of the goods so treated was then tested by inoculating cuttings from the test sample with a 24-hour-old culture of *Staphylococcus aureus* SG 511, incubation for 24 hours in a moisture chamber and then extracting with a sterile physiological solution. The weight ratio of physiological solution to the cutting of the test sample was 1:20. Afer 20, 40, 80 and 160 minutes, 1 ml. was taken from each of the extraction solutions and mixed with 20 ml. of nutrient agar. The nutrient agar was poured into dishes and left for 48 hours in a thermostat for 37°. The following counts of bacteria per ccm of extraction solution were made by this method:

Table 5

The figures give the number of bacteria per ml. of extraction solution.

[Addition to washing liquor]

| Washing temperature | Treatment time in minutes | Without addition of active substances | 200 p.p.m. of compound of Formula II | 200 p.p.m. of compound of Formula I | 200 p.p.m. mixture of 1 part of II and 2 parts of I |
|---|---|---|---|---|---|
| 40° | 20 | $4 \times 10^4$ | $3 \times 10^3$ | $3 \times 10^4$ | 900 |
|  | 40 | $3 \times 10^4$ | $8 \times 10^2$ | $2 \times 10^4$ | 3 |
|  | 80 | $3 \times 10^4$ | $7 \times 10^1$ | $8 \times 10^3$ | 1 |
|  | 160 | $4 \times 10^4$ | $2 \times 10^1$ | $1 \times 10^3$ | 0 |
| 90° | 20 | $6 \times 10^4$ | $8 \times 10^3$ | $9 \times 10^3$ | 7 |
|  | 40 | $7 \times 10^4$ | $4 \times 10^3$ | $6 \times 10^3$ | 0 |
|  | 80 | $5 \times 10^4$ | $8 \times 10^2$ | $8 \times 10^2$ | 0 |
|  | 160 | $5 \times 10^4$ | $2 \times 10^2$ | $5 \times 10^2$ | 0 |

It can be seen from this table that the action of the mixture of active substances according to the invention is considerably higher than the sum of the actions of the individual components.

Similar results are obtained when, instead of Compound II, the compound of the formula

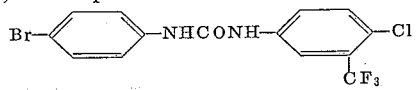

is used.

EXAMPLE 5.—SYNERGISTIC EFFECT ON *ESCHERICHIA COLI* 96 TESTED ON COTTON OF MIXTURES OF ACTIVE SUBSTANCES

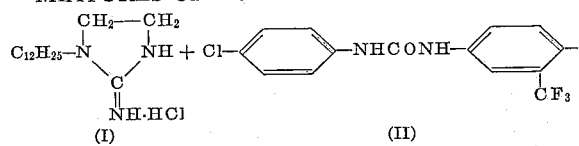

2 parts of the compound of Formula I + 1 part of compound of Formula II are dissolved in 3 parts of ethylene glycol monoethyl ether and this solution is added to the washing liquor so that there are 200 mg. of active substance per litre washing liquor. In addition to the active substance, the washing liquor contained 0.3 g./litre of octylphenol polyglycol ether as wash-active substance, 1.7 g./litre of polyphosphate and 0.5 g./litre of perborate. The ratio of liquor to cotton fabric is 6:1. The washing temperature was 40° and time 18 minutes at this temperature. After washing, the goods were rinsed 4 times, then mangled and dried. In order to test the lasting disinfectant action of the textiles so washed, cuttings from the goods were inoculated with 24 hour old cultures of *Escherichia coli* 96. After 3, 6, 12 and 24 hours, adequate cuttings of the artificially inoculated goods are taken, extracted with a physiologically sterile solution and 1 ml. of each of these extraction solutions is mixed with 20 ml. of nutrient agar. The agar suspensions are then poured into dishes. After breeding for 48 hours at 37°, the colonies formed in the nutrient agar are counted. The results were as follows:

Table 6

The figures give the number of bacteria per 1 ml. of extraction solution.

| Washing temperature | Action time in hours | Without addition | Addition to liquor | | 200 p.p.m. mixture of 2 parts (I) and 1 part (II) |
|---|---|---|---|---|---|
|  |  |  | 200 p.p.m. (II) | 200 p.p.m. (I) |  |
| 40° | 0 | $1 \times > 10^5$ | $1 \times > 10^5$ | $1 \times > 10^5$ | $1 \times > 10^5$ |
|  | 3 | $1 \times > 10^5$ | $1 \times > 10^5$ | $1 \times > 10^5$ | $1 \times > 10^5$ |
|  | 6 | $1 \times > 10^5$ | $1 \times > 10^5$ | $1 \times > 10^5$ | about 300 |
|  | 12 | $1 \times > 10^5$ | $1 \times > 10^5$ | $6 \times 10^4$ | about 60 |
|  | 24 | $1 \times > 10^5$ | $1 \times > 10^5$ | about 300 | 0 |

It can be proved from these figures that the addition of the individual components has a much slower action than the simultaneous addition of both components.

EXAMPLE 6.—TO MAKE COTTON POOR IN PATHOGENS

A cutting of cotton is first washed with an anion active or with a non-ionogenic washing agent and then rinsed with an amount of water of 5 to 10 times its weight which contains about 0.1% of distearyldimethyl ammonium chloride, 0.25% of the compound of formula

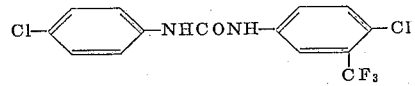

and 0.85% of the compound of formula

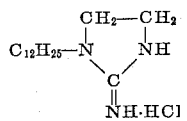

(calculated on the weight of the sample of fabric).

The sample of fabric so treated is not only soft and full but it remains for a longer time poor in pathogens.

EXAMPLE 7.—TO MAKE COTTON POOR IN PATHOGENS

A piece of cotton is first washed with soap or an alkaline washing agent and then rinsed with water which contains ammonium silicofluoride to remove traces of yellowing alkalinity. About 0.25% of the compound of formula

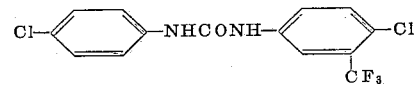

and 0.85% of the compound of the formula

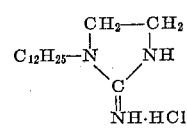

(calculated on the weight of the fabric) are added to the rinsing liquor.

The sample of fabric so treated has substantially no bacteria for a longer time.

Similar results are obtained if, in the above example, instead of ammonium silicofluoride, zinc silicofluoride or oxalic acid are used and otherwise the same procedure is followed.

What is claimed is:

1. A method for decreasing the number of bacteria and fungi in a substrate infested therewith, comprising applying to said substrate a mixture consisting essentially of (I) at least one member selected from the group consisting of (a) a compound of the formula

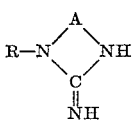

wherein

R is alkyl with from 12 to 14 carbon atoms,
A is alkylene with from 2 to 3 carbon atoms, at least two carbon atoms of which are chain members between N and NH, and (b) a salt thereof with an acid which is compatible with the bactericidal and fungicidal action of the mixture, and (II) at least one compound of the formula

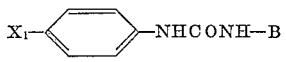

wherein $X_1$ represents a member selected from the group consisting of chlorine and bromine, and
B is a member selected from the group consisting of

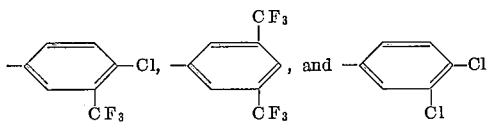

the weight ratio of (I):(II) ranging from 3:1 to 2:3.

2. A bactericidal and fungicidal mixture consisting essentially of
(I) at least one member selected from the group consisting of
(a) a compound of the formula

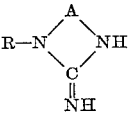

wherein

R is alkyl with from 12 to 14 carbon atoms,
A is alkylene with from 2 to 3 carbon atoms, at least two carbon atoms of which are chain members between N and NH, and (b) a salt thereof with an acid which is compatible with the bactericidal and fungicidal action of the mixture, and (II) at least one compound of the formula

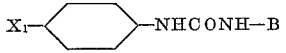

wherein $X_1$ represents a member selected from the group consisting of chlorine and bromine, and
B is a member selected from the group consisting of

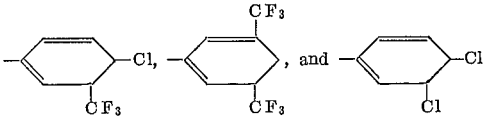

the weight ratio of (I):(II) ranging from 3:1 to 2:3.

3. The composition consisting essentially of (I)

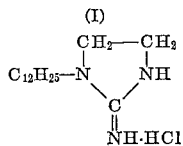

and (II)

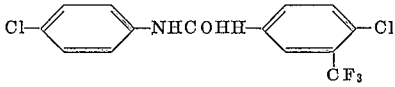

the weight ratio of (I):(II) ranging from 8:2 to 3:7.

4. The composition consisting essentially of (I)    (II)

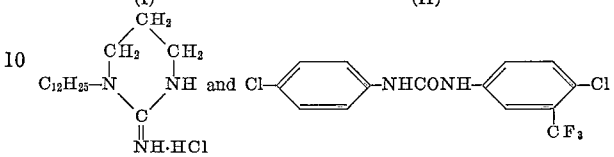

the weight ratio of (I):(II) being 1:1.

5. The composition consisting essentially of (I)

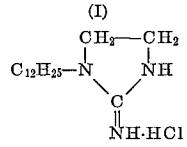

and (II)

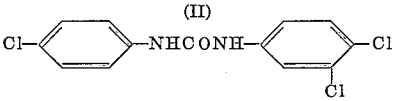

the weight ratio of (I):(II) ranging from 8:2 to 4:6.

6. The composition consisting essentially of (I)

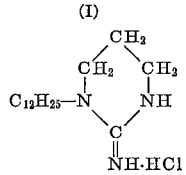

and (II)

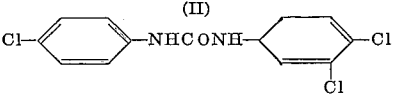

the weight ratio of (I):(II) being about 1:1.

7. A method according to claim 1 wherein the salt (b) is hydrohalide.

8. A method according to claim 1 wherein the salt (b) is sulphate.

9. A method according to claim 1 wherein the salt (b) is acetate.

10. A method according to claim 1 wherein the salt (b) is lactate.

11. A composition according to claim 2 wherein the salt (b) is hydrohalide.

12. A composition according to claim 2 wherein the salt (b) is sulphate.

13. A composition according to claim 2 wherein the salt (b) is acetate.

14. A composition according to claim 2 wherein the salt (b) is lactate.

References Cited by the Examiner

UNITED STATES PATENTS

| | | | |
|---|---|---|---|
| 2,689,249 | 9/54 | Benneville et al. | 167—33 |
| 2,745,874 | 5/56 | Schetty et al. | 260—553 |
| 2,818,390 | 12/57 | Beaver et al. | 260—553 |
| 3,027,370 | 3/62 | Bindler et al. | 167—33 |
| 3,084,097 | 4/63 | Reller et al. | 167—30 |

OTHER REFERENCES

Yale, Journal of Medicinal and Pharmaceutical Chemistry, vol. I, No. 2, p. 121 (1959).

JULIAN S. LEVITT, *Primary Examiner.*

FRANK CACCIAPAGLIA, JR., *Examiner.*